(12) United States Patent
Chen et al.

(10) Patent No.: US 12,548,837 B2
(45) Date of Patent: Feb. 10, 2026

(54) BATTERY CELL, MANUFACTURING METHOD AND MANUFACTURING SYSTEM THEREOF, BATTERY, AND POWERED DEVICE

(71) Applicant: CONTEMPORARY AMPEREX TECHNOLOGY (HONG KONG) LIMITED, Hong Kong (CN)

(72) Inventors: Xinxiang Chen, Ningde (CN); Yulian Zheng, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 275 days.

(21) Appl. No.: 18/155,037

(22) Filed: Jan. 16, 2023

(65) Prior Publication Data
US 2023/0155233 A1    May 18, 2023

Related U.S. Application Data

(63) Continuation of application No. PCT/CN2021/107586, filed on Jul. 21, 2021.

(51) Int. Cl.
*H01M 50/24* (2021.01)
(52) U.S. Cl.
CPC .................................. *H01M 50/24* (2021.01)
(58) Field of Classification Search
CPC . H01M 50/20; H01M 50/342; H01M 50/3425
See application file for complete search history.

(56) References Cited

U.S. PATENT DOCUMENTS

| 2012/0315515 | A1* | 12/2012 | Guen | H01M 50/578 |
| | | | | 429/163 |
| 2014/0017524 | A1* | 1/2014 | Ootsuka | B21D 51/383 |
| | | | | 72/352 |

(Continued)

FOREIGN PATENT DOCUMENTS

| CN | 102386358 A | 3/2012 |
| CN | 207134411 U | 3/2018 |

(Continued)

OTHER PUBLICATIONS

Notice of Reasons for Refusal received in the corresponding Japanese Application 2022-569232, mailed on Jul. 2, 2024.

(Continued)

*Primary Examiner* — Maria Laios
*Assistant Examiner* — Jordan E Berresford
(74) *Attorney, Agent, or Firm* — K&L Gates LLP (57) ABSTRACT

Examples of the present application relate to a battery cell, a manufacturing method and a manufacturing system thereof, a battery, and a powered device. The battery cell includes: a shell, where the shell has a wall portion; an electrode assembly accommodated in the shell; and a pressure relief mechanism. The pressure relief mechanism is provided on the wall portion, the pressure relief mechanism includes a weak portion, a body portion, and a connecting portion. The weak portion is configured to be damaged when pressure inside the shell reaches a threshold so as to relieve the pressure. The body portion is located in a region defined by the weak portion. The connecting portion is located on an outer side of the weak portion and configured to connect the wall portion.

16 Claims, 6 Drawing Sheets

(56) References Cited

U.S. PATENT DOCUMENTS

2018/0062134 A1 3/2018 Bauer
2019/0355943 A1* 11/2019 Chen .................. H01M 50/186

FOREIGN PATENT DOCUMENTS

| | | |
|---|---|---|
| CN | 209418616 U | 9/2019 |
| CN | 211150600 U | 7/2020 |
| CN | 111668399 A | 9/2020 |
| CN | 211578857 U | 9/2020 |
| CN | 112713345 A | 4/2021 |
| JP | 2002008615 A | 1/2002 |
| JP | 2007141518 A | 6/2007 |
| JP | 2010049883 A | 3/2010 |
| JP | 2012178333 A | 9/2012 |
| JP | 2014186804 A | 10/2014 |
| JP | 2016081867 A | 5/2016 |
| JP | 2019200888 A | 11/2019 |
| JP | 2021034553 A | 3/2021 |
| TW | M395262 U1 | 12/2010 |
| WO | 2019039363 A1 | 2/2019 |
| WO | 2018230148 A1 | 5/2020 |
| WO | 2021117426 A1 | 6/2021 |
| WO | 2020149350 A1 | 11/2021 |

OTHER PUBLICATIONS

Extended European search report received in the corresponding European Application 21938136.5, issued on Aug. 2, 2023.
International Search Report and Written Opinion received in the corresponding International Application PCT/CN2021/107586, mailed Mar. 28, 2022.
Notice of Reasons for Refusal received in the corresponding Japanese Application 2022-569232, issued on Dec. 20, 2023.
The Notice of Reasons for Refusal received in the counterpart JP application 2022-569232, mailed on Mar. 7, 2025, 11 pages with English translation.

* cited by examiner

BATTERY CELL, MANUFACTURING METHOD AND MANUFACTURING SYSTEM THEREOF, BATTERY, AND POWERED DEVICE

CROSS-REFERENCE TO RELATED APPLICATIONS

This application is a continuation of International Application PCT/CN2021/107586, filed Jul. 21, 2021 and entitled "BATTERY CELL, MANUFACTURING METHOD AND MANUFACTURING SYSTEM THEREOF, BATTERY, AND POWERED DEVICE", which is incorporated herein by reference in its entirety.

TECHNICAL FIELD

The present application relates to the technical field of batteries, and more particularly to a battery cell, a manufacturing method and a manufacturing system thereof, a battery, and a powered device.

BACKGROUND ART

Battery cells are widely used in electronic devices, such as mobile phones, laptop computers, battery cars, electric vehicles, electric planes, electric ships, electric toy cars, electric toy ships, electric toy planes, and electric tools. The battery cells may include nickel-cadmium battery cells, nickel-hydrogen battery cells, lithium-ion battery cells, secondary alkaline zinc-manganese battery cells, and the like.

In the development of battery technologies, in addition to improving the performance of the battery cells, safety is also an issue that cannot be ignored. If the safety of a battery cell cannot be guaranteed, the battery cell cannot be used. Therefore, how to enhance the safety of the battery cells is an urgent technical problem to be solved in the battery technologies.

SUMMARY OF THE INVENTION

The present application provides a battery cell, a manufacturing method and a manufacturing system thereof, a battery, and a powered device, which can enhance the safety of the battery cell.

In a first aspect, a battery cell is proposed according to an example of the present application, including: a shell, where the shell has a wall portion; an electrode assembly, where the electrode assembly is accommodated in the shell; a pressure relief mechanism, where the pressure relief mechanism is provided on the wall portion, the pressure relief mechanism includes a weak portion, a body portion, and a connecting portion, the weak portion is configured to be damaged when pressure inside the shell reaches a threshold so as to relieve the pressure, the body portion is located in a region defined by the weak portion, and the connecting portion is located on an outer side of the weak portion and configured to connect the wall portion; the body portion protrudes relative to the connecting portion in a direction away from the electrode assembly, and a first concave portion is formed in the pressure relief mechanism at a position corresponding to the body portion on a side facing the electrode assembly.

In the above solution, in the battery cell according to the example of the present application, the body portion protrudes relative to the connecting portion in a direction away from the electrode assembly, a sudden change in a cross section occurs at the weak portion, stress concentration occurs in the weak portion, and the first concave portion is formed in the pressure relief mechanism at a position corresponding to the body portion on a side facing the electrode assembly, which further aggravates the stress concentration of the weak portion, making the weak portion easy to break and capable of releasing pressure when the pressure in the shell reaches a threshold, and ensures the safety of the battery cell in the case of thermal runaway, being conducive to improving stability and safety of use of the battery cell.

In some examples, the weak portion is formed by providing a groove on the pressure relief mechanism.

In the above solution, a groove is provided to reduce a local thickness of the pressure relief mechanism, so as to form the weak portion.

In some examples, a thickness of the body portion and a thickness of the connecting portion are both greater than a thickness of the weak portion.

In the above solution, the weak portion has lower strength than the body portion and the connecting portion, and is more easily damaged, so as to relieve the pressure of the battery cell in time.

In some examples, the thickness of the connecting portion is B1, and the thickness of the weak portion is W1, where $0.1 \leq W1/B1 \leq 0.5$.

In the above scheme, when the thicknesses of the weak portion and the connecting portion are within the above numerical range, machining accuracy of the weak portion can be improved, thereby improving uniformity of the thickness of the weak portion. When the weak portion is subjected to alternating stress, degrees of damages to the weak portion is relatively uniform, so that blasting consistency of the battery can be improved.

When $W1/B1<0.1$, the thickness of the weak portion is relatively thin, the strength of the weak portion is low, and the weak portion is easily damaged when the battery cell does not undergo thermal runaway. Moreover, when the weak portion with the thickness is formed, a dimension of the weak portion fluctuates greatly, and the thickness thereof has poor uniformity. When weak portions of different battery cells are subjected to alternating stress, regions or degrees of fatigue aging may be different, resulting in poor consistency of blasting pressure relief of different battery cells.

When $W1/B1>0.5$, the thickness of the weak portion is relatively thick, and the strength of the weak portion is high. When a preset pressure value of the battery cell is small, the weak portion is not easy to be damaged. When the battery cell is subjected to thermal runaway, gas inside the battery cell cannot be discharged in time, and the battery cell is prone to expansion or even explosion.

In some examples, projections of the groove and the first concave portion in a first direction at least partially overlap, and the first direction is perpendicular to a thickness direction of the pressure relief mechanism.

In the above solution, the groove and the weak portion are arranged correspondingly in the thickness direction, and the projections of the groove and the first concave portion in the first direction at least partially overlap, which may aggravate the stress concentration of the weak portion, the weak portion is more easily damaged, and the pressure of the battery cell can be relieved in time.

In some examples, the connecting portion has a first outer surface and a first inner surface along the thickness direction of the pressure relief mechanism, and the first inner surface faces the electrode assembly; and the groove is recessed relative to the first inner surface in a direction away from the electrode assembly; and/or the groove is recessed relative to the first outer surface in a direction toward the electrode assembly.

In some examples, the connecting portion has a first outer surface and a first inner surface along the thickness direction of the pressure relief mechanism, and the first inner surface faces the electrode assembly; and the first concave portion is recessed relative to the first inner surface in a direction away from the electrode assembly, and at least a part of the body portion protrudes from the first outer surface.

In some examples, in the thickness direction of the pressure relief mechanism, the thickness of the connecting portion is B1, and a height of the body portion is H, where H/B1≤2.

In the above solution, when the thicknesses of the connecting portion and the body portion are within the above numerical range, the body portion has a moderate height and is easily machined, which can prevent interference between the body portion and a foreign matter outside the battery cell in a case where the stress concentration at the weak portion is aggravated.

When H/B1>2, the body portion is excessively high and is not easily machined. Moreover, the excessively high body portion may protrude from a surface of the battery cell to interfere with a foreign matter outside the battery cell.

In some examples, the first concave portion has a bottom wall, the first concave portion is recessed from the first inner surface to the bottom wall in a direction away from the electrode assembly, and the bottom wall does not extend beyond the first outer surface in a direction away from the electrode assembly.

In the above solution, along the thickness direction, as a distance between the bottom wall and the first outer surface decreases, the first concave portion is recessed deeper in the thickness direction, stress concentration is more easily formed at a junction between the body portion corresponding to the position of the first concave portion and the weak portion, and the weak portion is more easily damaged.

In some examples, the pressure relief mechanism further includes a transition portion, the transition portion is provided around the connecting portion and configured to connect the wall portion and the connecting portion, and a thickness of the transition portion is greater than that of the connecting portion.

In the above solution, the thickness of the transition portion is relatively thicker, which can improve welding strength of the transition portion, and prevent distortion or burn-through during welding caused by a small thickness of the transition portion. In addition, the thickness of the connecting portion is relatively thinner, so that the pressure relief mechanism is easily broken when subjected to alternating stress, and the pressure can be relieved in time.

In some examples, the thickness of the connecting portion is B1, and the thickness of the transition portion is B2, where B1/B2≤⅔.

In the above solution, when the thicknesses of the connecting portion and the transition portion are within this numerical range, the thicknesses of the connecting portion and the transition portion are moderate, which can satisfy both welding strength of the transition portion and a strength requirement of the connecting portion.

In some examples, the connecting portion has a first outer surface and a first inner surface along the thickness direction of the pressure relief mechanism, and the first inner surface faces the electrode assembly; the transition portion has a second outer surface and a second inner surface along the thickness direction of the pressure relief mechanism, and the second inner surface faces the electrode assembly; and the second outer surface protrudes from the first outer surface in a direction away from the electrode assembly; and/or the second inner surface protrudes from the first inner surface in a direction close to the electrode assembly.

In some examples, the body portion protrudes relative to the transition portion in a direction away from the electrode assembly.

In the above solution, a stepped structure is formed among the body portion, the weak portion, the connecting portion, and the transition portion, and the weak portion and the connecting portion are prone to stress concentration. In particular, the stress concentration of the weak portion may be aggravated, the weak portion is easily damaged, and the pressure of the battery cell can be relieved in time.

In some examples, a minimum dimension of the connecting portion along a first direction is greater than 0.1 mm, and the first direction is perpendicular to the thickness direction of the pressure relief mechanism.

In the above solution, the weak portion is closer to a central position of the pressure relief mechanism, the weak portion is subjected to more uniform alternating stress, and the consistency of the fracture of the weak portion is higher.

In some examples, the battery cell further includes a protective sheet, and the protective sheet is attached to an outer surface of the wall portion and covers the pressure relief mechanism.

In the above solution, the protective sheet can protect the pressure relief mechanism, and reduce distortion or dent formation of the pressure relief mechanism caused by an accidental impact or scratch of an external object on the pressure relief mechanism.

In some examples, the shell includes an end cap and a case, the case is provided with an opening, and the end cap is configured to cover the opening, where the wall portion is the end cap.

In the above solution, when the pressure relief mechanism is actuated to discharge high temperature and high pressure substances, the structure of the end cap may not be substantially affected.

In a second aspect, the present application provides a battery, including the battery cell according to any one of the examples in the first aspect.

In a third aspect, the present application provides a powered device, including the battery cell according to the example in the third aspect. The battery cell is configured to provide electric energy.

In a fourth aspect, according to an example of the present application, a manufacturing method for a battery cell is provided, including: providing an end cap, where the end cap is provided with a pressure relief mechanism and an electrode terminal, the pressure relief mechanism includes a weak portion, a body portion, and a connecting portion, the body portion is located in a region defined by the weak portion, the connecting portion is located on an outer side of the weak portion and configured to connect the end cap, the body portion protrudes relative to the connecting portion, and a first concave portion is formed in the pressure relief mechanism at a position corresponding to the body portion; providing an electrode assembly; providing a case, where the case has an opening; connecting the electrode assembly to the electrode terminal; and placing the electrode assembly into the case, and then connecting the end cap to the case to close the opening of the case, where the weak portion is configured to be damaged when pressure inside the case reaches a threshold so as to relieve the pressure; the body portion protrudes relative to the connecting portion in a direction away from the electrode assembly, and the first concave portion is formed in the pressure relief mechanism at a position corresponding to the body portion on a side facing the electrode assembly.

In a fifth aspect, according to an example of the present application, a manufacturing system for a battery cell is provided, including: a first providing device configured to provide an end cap, where the end cap is provided with a pressure relief mechanism and an electrode terminal, the pressure relief mechanism includes a weak portion, a body portion, and a connecting portion, the body portion is located in a region defined by the weak portion, the connecting portion is located on an outer side of the weak portion and configured to connect the end cap, the body portion protrudes relative to the connecting portion, and a first concave portion is formed in the pressure relief mechanism at a position corresponding to the body portion; a second providing device configured to provide an electrode assembly; a third providing device configured to provide a case, where the case has an opening; a first assembling device configured to connect the electrode assembly to the electrode terminal; and a second assembling device configured to place the electrode assembly into the case, and then connect the end cap to the case to close the opening of the case, where the weak portion is configured to be damaged when pressure inside the case reaches a threshold so as to relieve the pressure; the body portion protrudes relative to the connecting portion in a direction away from the electrode assembly, and the first concave portion is formed in the pressure relief mechanism at a position corresponding to the body portion on a side facing the electrode assembly.

DESCRIPTION OF DRAWINGS

In order to illustrate the technical solutions of the examples of the present application more clearly, the drawings required in the examples of the present application will be briefly introduced below. Obviously, the drawings described below are only some examples of the present application. For those of ordinary skill in the art, other drawings can also be obtained according to the drawings without any creative effort.

In the drawings, the drawings may not be drawn to actual scale.

DESCRIPTION OF REFERENCE NUMERALS

X. thickness direction; Y. first direction; 1. vehicle; 1a. motor; 1b. controller; 10. battery; 11. bottom case; 12. top case; 20. battery; 30. battery cell; 40. shell; 41. end cap; 42. case; 421. opening; 412. through hole; 50. electrode assembly; 51. tab; 60. electrode terminal; 70. adapter member; 80. pressure relief mechanism; 81. body portion; 82. connecting portion; 82a. first outer surface; 82b. first inner surface; 83. weak portion; 83c. groove; 84. first concave portion; 841. bottom wall; 85. transition portion; 85a. second outer surface; 85b. second inner surface.

DETAILED DESCRIPTION

To make the objective, technical solutions and advantages of the examples of the present application more clear, the technical solutions in the examples of the present application will be clearly described below with reference to the drawings in the examples of the present application. Obviously, the examples described are some of rather than all of the examples of the present application. Based on the examples in the present application, all other examples obtained by those of ordinary skill in the art without creative effort fall within the protection scope of the present application.

Unless otherwise defined, all technical and scientific terms used herein have the same meaning as commonly understood by those skilled in the art to which the present disclosure belongs. The terms used in the specification of the present application are for the purpose of describing specific examples only, and are not intended to limit the present application. The terms "include" and "have" and any variations thereof in the specification and claims of the present application as well as in the above description of drawings are intended to cover a non-exclusive inclusion. The terms "first", "second" and the like in the specification and claims of the present application or the above drawings are used to distinguish different objects, rather than to describe a specific order or primary and secondary relationship.

Reference to "an example" means that a particular feature, structure, or characteristic described in connection with the example can be included in at least one example of the present application. The appearance of this phrase in various places in the specification does not necessarily refer to the same example, nor is it a separate or alternative example that is mutually exclusive with other examples.

In the description of the present application, unless otherwise expressly specified and limited, the technical terms "mount," "connected," "connect" and "attach" should be broadly understood. For example, they may be a fixed connection or a detachable connection or be integrated; or may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B indicates that there are three cases of A alone, A and B together, and B alone. In addition, the character "/" in the present application generally means that associated objects before and after it are in an "or" relationship.

In the examples of the present application, the same reference numerals denote the same components, and for the sake of brevity, detailed descriptions of the same components are omitted in different examples. It should be understood that the thickness, length, width and other dimensions of various components in the examples of the present application shown in the accompanying drawings, as well as the overall thickness, length and width, etc. of the integrated device are only exemplary descriptions, and should not constitute any limitation to the present application.

The "plurality" in the present application refers to two or more (including two).

In the present application, battery cells may include a lithium-ion secondary battery, a lithium-ion primary battery, a lithium-sulfur battery, a sodium-lithium-ion battery, a sodium-ion battery, or a magnesium-ion battery, etc., which is not limited in the examples of the present application. The battery cells may be cylindrical, flat, rectangular, or in other shapes, which is not limited in the examples of the present application. The battery cells are generally divided into three types according to packaging manners: cylindrical battery cells, rectangular battery cells, and pouch cells, which are not limited in the examples of the present application.

The battery mentioned in the examples of the present application refers to a single physical module including one or more battery cells to provide a higher voltage and capacity. For example, the battery mentioned in the present application may include a battery module, a battery pack, or the like. The battery typically includes a box body for encapsulating one or more battery cells. The box body can prevent the influence of liquids or other foreign matters on charging or discharging of the battery cell.

The battery cell includes an electrode assembly and an electrolyte solution. The electrode assembly is composed of a positive electrode sheet, a negative electrode sheet and an isolator. The battery cell operates mainly relying on movement of metal ions between the positive electrode sheet and the negative electrode sheet. The positive electrode sheet includes a positive electrode current collector and a positive electrode active material layer. A surface of the positive electrode current collector is coated with the positive electrode active material layer. Current collectors not coated with the positive electrode active material layer protrude from the current collector coated with the positive electrode active material layer. The current collectors not coated with the positive electrode active material layer are stacked and serve as positive electrode tabs. Taking a lithium-ion battery as an example, the material of the positive electrode current collector may be aluminum, and a positive electrode active material may be lithium cobaltate, lithium iron phosphate, ternary lithium or lithium manganate. The negative electrode sheet includes a negative electrode current collector and a negative electrode active material layer. A surface of the negative electrode current collector is coated with the negative electrode active material layer. Current collectors not coated with the negative electrode active material layer protrude from the current collector coated with the negative electrode active material layer. The current collectors not coated with the negative electrode active material layer are stacked and serve as negative electrode tabs. The material of the negative electrode current collector may be copper, and the negative electrode active material may be carbon, silicon, or the like. A diaphragm may be made from polypropylene (PP), polyethylene (PE), or the like. In addition, the electrode assembly may be a wound structure or a laminated structure, which is not limited in the examples of the present application.

Many design factors, such as energy density, cycle life, discharge capacity, charge-discharge rate and other performance parameters, should be considered in the development of the battery technology. In addition, the safety of the battery also needs to be taken into account.

A pressure relief mechanism on the battery cell has an important impact on the safety of the battery. For example, when a short circuit, overcharge, or the like occurs, it may cause thermal runaway inside the battery cell, resulting in a sudden rise in pressure or temperature. In this case, internal pressure and temperature can be relieved outward through the actuation of the pressure relief mechanism to prevent explosion and fire of the battery cell.

The pressure relief mechanism refers to an element or component that is actuated to relieve the internal pressure or temperature when the internal pressure or temperature of the battery cell reaches a predetermined threshold. The design of the threshold varies according to different design requirements. The threshold may depend on the materials of one or more of the positive electrode sheet, the negative electrode sheet, the electrolyte solution, and the isolator in the battery cell. The pressure relief mechanism may take the form of an explosion-proof valve, a gas valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weak structure provided in the pressure relief mechanism is damaged, so as to form an opening or channel for releasing the internal pressure or temperature.

The "actuate" mentioned in the present application means that the pressure relief mechanism is actuated or activated to a certain state, so that the internal pressure and temperature of the battery cell can be relieved. Actions produced by the pressure relief mechanism may include, but are not limited to, at least a part of the pressure relief mechanism being broken, crushed, torn or opened, and the like. When the pressure relief mechanism is actuated, high temperature and high pressure substances inside the battery cell may be discharged outward from the actuated part as emissions. In this way, the pressure and temperature of the battery cell can be relieved under controllable pressure or temperature, so as to prevent potential more serious accidents.

The emissions from the battery cell mentioned in the present application include, but are not limited to, the electrolyte solution, dissolved or split positive and negative electrode sheets, fragments of the isolator, high temperature and high pressure gas generated by reaction, flames, and the like.

The applicant has found that, during the cycle of the battery cell, the battery cell does not blast and relieves pressure even when reaching a predetermined condition of thermal runaway, and thus the structure and use environment of the battery cell have been analyzed and studied. In the process of transportation, temperature change or charging and discharging of the battery cell, the internal pressure of the battery cell changes alternately between high and low, which causes the pressure relief mechanism to flip back and forth. That is, the pressure relief mechanism is subjected to the alternating stress generated by the gas inside the battery cell. The applicant has found that when the preset pressure value of the battery cell is small, the requirement on the strength of the pressure relief mechanism is correspondingly low. However, in order to ensure the dimensional accuracy of the pressure relief mechanism, there is a need to maintain the pressure relief mechanism with a certain strength. In this way, the battery cell is not prone to fatigue deformation or fracture even if subjected to the alternating stress generated by the gas inside the battery cell, and even when the internal pressure of the battery cell exceeds the preset pressure value, the pressure relief mechanism may not break, and the battery cell cannot exhaust in time, causing safety hazards.

Based on the above problems found by the applicant, the applicant has improved the structure of the battery cell. The technical solutions described in the examples of the present application are applicable to a battery cell, a battery including the battery cell, and a powered device using the battery.

The powered device may be, but not limited to, a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid electric vehicle, an extended-range electric vehicles, or the like. The spacecraft includes airplanes, rockets, space shuttles, spacecrafts, and the like. The electric toy includes fixed or mobile electric toys, such as game consoles, electric car toys, electric ship toys, and electric airplane toys. The electric tool includes metal cutting electric tools, grinding electric tools, assembling electric tools, and railway electric tools, such as, electric drills, electric grinders, electric wrenches, electric screwdrivers, electric hammers, electric impact drills, concrete vibrators, and electric planers. The examples of the present application do not impose special limitations on the above powered apparatus.

In the following examples, for the convenience of description, the powered device is a vehicle.

Figure 1:
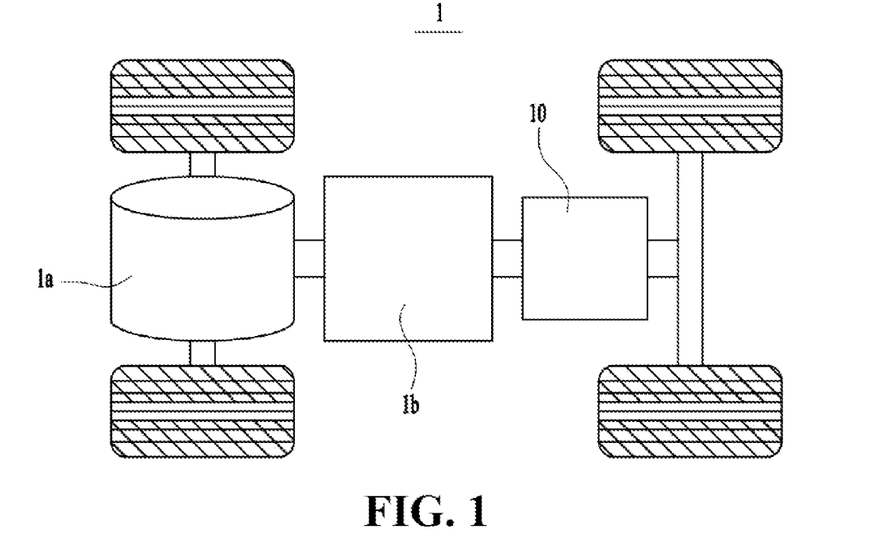
FIG. 1 is a schematic structural diagram of a vehicle according to an example of the present application.

As shown in FIG. 1, a battery 10 is provided inside a vehicle 1. The battery 10 may be provided at the bottom or head or rear of the vehicle 1. The battery 10 may be configured to power the vehicle 1. for example, the battery 10 may be used as an operating power source of the vehicle 1.

The vehicle 1 may also include a controller 1*b* and a motor 1*a*. The controller 1*b* is configured to control the battery 10 to supply power to the motor 1*a*, for example, configured for operation power requirements of the vehicle 1 for starting, navigating and driving.

In some examples of the present application, the battery 10 may not only be used as the operating power source of the vehicle 1, but also be used as a driving power source of the vehicle 1 to replace or partially replace fuel or natural gas to provide driving power for the vehicle 1.

Figure 2:
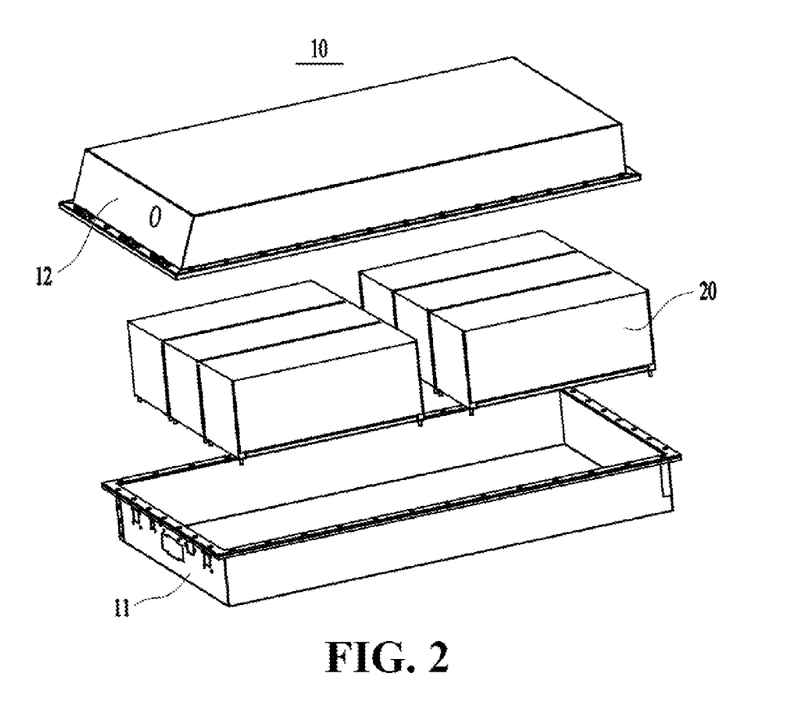
FIG. 2 is a schematic diagram of a disassembled structure of a battery according to an example of the present application.
Figure 3:
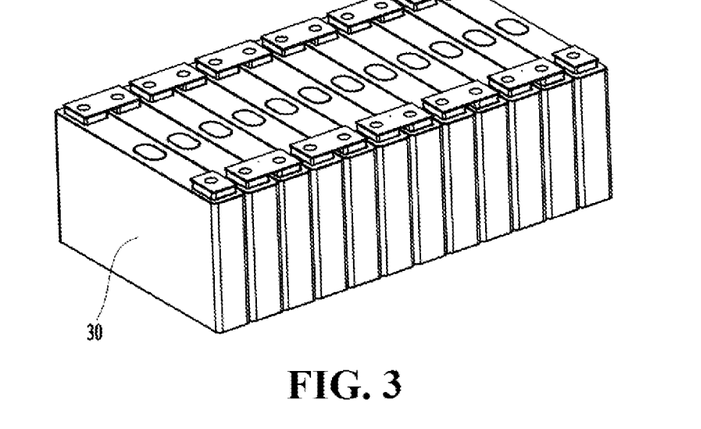
FIG. 3 is a schematic structural diagram of a battery module shown in FIG. 2.

As shown in FIG. 2 and FIG. 3, the battery 10 includes a battery cell 30 (not shown in FIG. 2). The battery 10 may also include a box body for accommodating the battery cell 30.

The box body is used for accommodating the battery cell 30, and the box may be in various structural forms.

In some examples, the box body may include a bottom case 11 and a top case 12. The bottom case 11 and the top case 12 are covered with each other. The bottom case 11 and the top case 12 together define an accommodating space for accommodating the battery cell 30. The bottom case 11 and the top case 12 may both have a hollow structure with one side open. An open side of the bottom case 11 covers the open side of the top case 12 to form a box body with an accommodating space. A sealing member may also be provided between the bottom case 11 and the top case 12 to achieve a sealed connection between the bottom case 11 and the top case 12.

In practice, the bottom case 11 may cover the top of the top case 12. The bottom case 11 may also be referred to as an upper box, and the top case 12 may also be referred to as a lower box.

The bottom case 11 and the top case 12 may have various shapes, for example, a cylinder, a cuboid, and the like. In FIG. 2, by way of example, the bottom case 11 and the top case 12 are both of a cuboid structure.

In the battery 10, one or more battery cells 30 may be provided. If there are a plurality of battery cells 30, the plurality of battery cells 30 may be connected in series or in parallel or in a combination thereof. The "in a combination thereof" means that the plurality of battery cells 30 are connected in series and in parallel. The plurality of battery cells 30 may be directly connected in series or in parallel or in a combination thereof, and then an entirety composed of the plurality of battery cells 30 may be accommodated in the box body, or the plurality of battery cells 30 may be connected in series or in parallel or in a combination thereof to form battery modules 20. A plurality of battery modules 20 are connected in series or in parallel or in a combination thereof to form an entirety, and are accommodated in the box body.

In some examples, as shown in FIG. 3, in the battery, a plurality of battery cells 30 are provided. The plurality of battery cells 30 are first connected in series or in parallel or in a combination thereof to form battery modules 20. A plurality of battery modules 20 are connected in series or in parallel or in a combination thereof to form an entirety, and are accommodated in the box body.

In some examples, the plurality of battery cells 30 in the battery module 20 may be electrically connected through a bus component, so as to realize parallel connection, series connection or hybrid connection of the plurality of battery cells 30 in the battery module 20.

Figure 4:
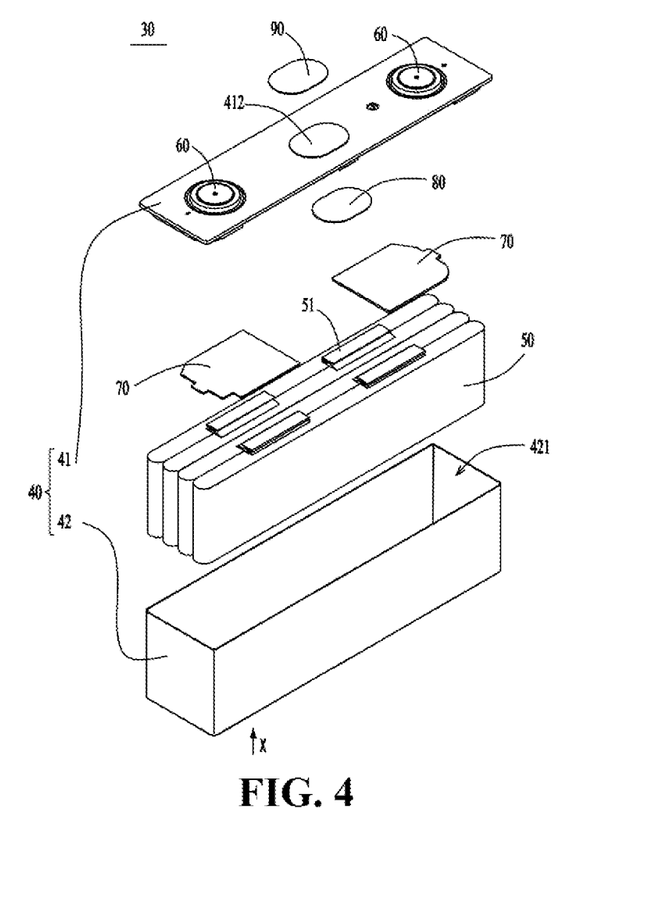
FIG. 4 is a schematic diagram of a disassembled structure of a battery cell according to an example of the present application.

As shown in FIG. 4, in some examples, the battery cell 30 includes a shell 40, an electrode assembly 50, an electrode terminal 60, an insulating member, and an adapter member 70. The shell 40 includes a case 42 and an end cap 41. The case 42 has an opening 421. The electrode assembly 50 is accommodated in the case 42, and the electrode assembly 50 includes tabs 51. The end cap 41 is configured to cover the opening 421. The electrode terminal 60 is mounted to the end cap 41. The insulating member is located on the side of the end cap 41 facing the electrode assembly 50. The adapter member 70 is configured to connect the electrode terminal 60 and the tabs 51, so that the tabs 51 and the electrode terminal 60 are electrically connected.

The case 42 may be in various shapes, such as a cylinder, a cuboid, or the like. The shape of the case 42 may be determined according to the specific shape of the electrode assembly 50. For example, if the electrode assembly 50 has a cylinder structure, the case 42 may be selected as a cylinder structure. If the electrode assembly 50 has a cuboid structure, the case 42 may be selected as a cuboid structure. In FIG. 4, by way of example, the case 42 and the electrode assembly 50 are both of a cuboid structure.

The case 42 may be made of various materials, such as copper, iron, aluminum, stainless steel, aluminum alloy, and plastic, which is not particularly limited in the examples of the present application.

One or more electrode assemblies 50 may be accommodated in the case 42. In FIG. 4, two electrode assemblies 50 are accommodated in the case 42.

In some examples, the electrode assembly 50 further includes a positive electrode sheet, a negative electrode sheet, and an isolator. The electrode assembly 50 may be a wound structure formed by winding the positive electrode sheet, the isolator, and the negative electrode sheet. The electrode assembly 50 may also be a laminated structure formed by stacking the positive electrode sheet, the isolator, and the negative electrode sheet.

The positive electrode sheet may include a positive electrode current collector and a positive electrode active material layer. A surface of the positive electrode current collector is coated with the positive electrode active material layer. The negative electrode sheet may include a negative electrode current collector and a negative electrode active material layer. A surface of the negative electrode current collector is coated with the negative electrode active material layer. The isolator is between the positive electrode sheet and the negative electrode sheet, and is configured to isolate the positive electrode sheet and the negative electrode sheet, so as to reduce a risk of short circuit between the positive electrode sheet and the negative electrode sheet.

The isolator may be made from PP, PE, or the like.

The tabs 51 in the electrode assembly 50 are divided into positive tabs and negative tabs. The positive tabs may be parts of the positive electrode current collector that are not coated with the positive electrode active material layer. The negative tabs may be parts of the negative electrode current collector that are not coated with the negative electrode active material layer.

Figure 5:
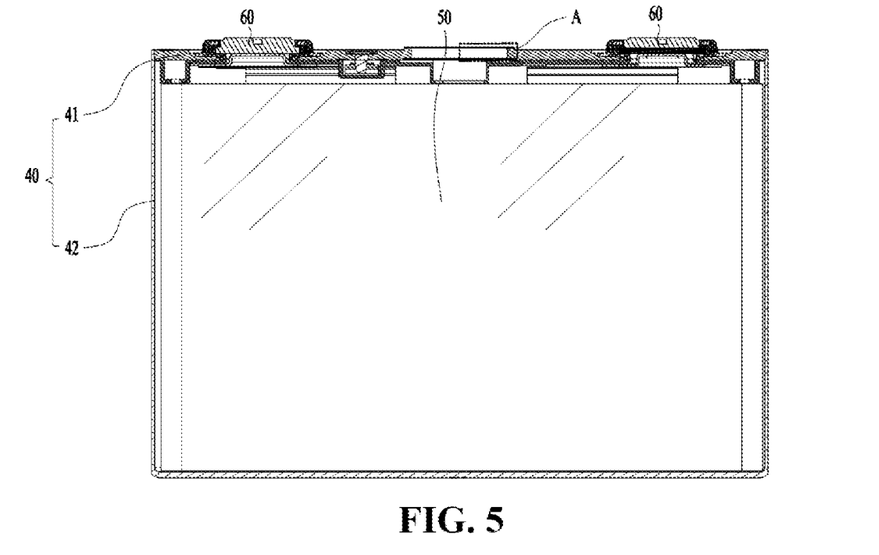
FIG. 5 is a schematic diagram of a sectional structure of the battery cell according to an example of the present application.
Figure 6:
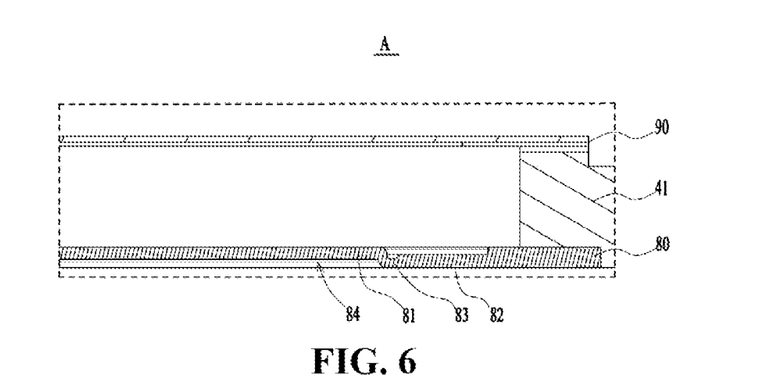
FIG. 6 is a schematic enlarged view of A in FIG. 5.
Figure 7:
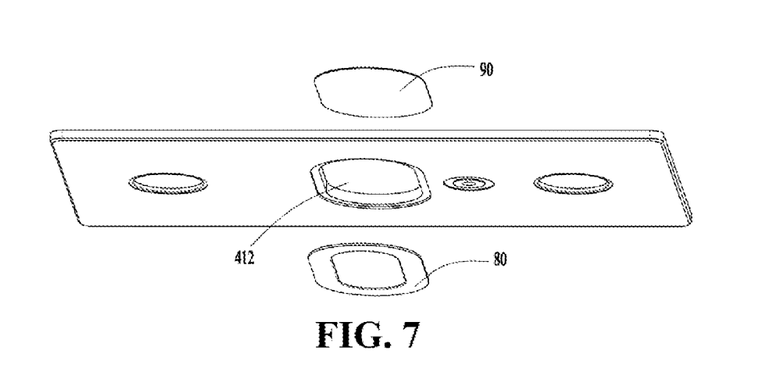
FIG. 7 is a schematic diagram of a disassembled structure of an end cap assembly of the battery cell according to an example of the present application.

In the examples of the present application, referring to FIG. 4 and FIG. 5, the end cap 41 is configured to cover the opening 421 of the case 42 to form a closed space for accommodating the electrode assembly 50. The closed space may also be used to accommodate electrolytes, such as an electrolyte solution. The electrode terminal 60 is an output member for outputting electric energy of the battery cell 30, and two electrode terminals may be provided.

The case 42 may include one or two openings 421. If the case 42 includes one opening 421, one end cap 41 may be provided. If the case 42 includes two openings 421, two end caps 41 may be provided. The two end caps 41 cover the two openings 421 respectively, and the electrode terminal 60 may be provided on each end cap 41.

In some examples, as shown in FIG. 4, the case 42 includes one opening 421, and one end cap 41 is provided. Two electrode terminals 60 may be provided in the end cap 41. One electrode terminal 60 is electrically connected to the positive tab of the electrode assembly 50 through one adapter member 70. The other electrode terminal 60 is electrically connected to the negative tab of the electrode assembly 50 through the other adapter member 70.

In other examples, the case 42 is provided with two openings 421. The two openings 421 are provided on two opposite sides of the case 42, and two end caps 41 are provided. The two end caps 41 cover the two openings 421 of the case 42 respectively. In this case, each end cap 41 may be provided with one electrode terminal 60. The electrode terminal 60 on one end cap 41 is electrically connected to one tab (positive tab) of the electrode assembly 50 through one adapter member 70. The electrode terminal 60 on the other end cap 41 is electrically connected to the other tab (negative tab) of the electrode assembly 50 through the other adapter member 70.

In some examples, as shown in FIG. 4, the battery cell 30 may further include a pressure relief mechanism 80. The pressure relief mechanism 80 is mounted on the shell 40. The pressure relief mechanism 80 is configured to relieve pressure inside the battery cell 30 when internal pressure or temperature of the battery cell 30 reaches a threshold.

For example, the pressure relief mechanism 80 may be an explosion-proof valve, a rupture disc, an air valve, a pressure relief valve, a safety valve, or the like.

Referring to FIG. 4 to FIG. 7, in some examples, the shell 40 of the example of the present application has a wall portion, the wall portion has a through hole 412, and the pressure relief mechanism 80 covers the through hole 412.

In the examples of the present application, referring to FIG. 4 to FIG. 7, in order to enable the pressure relief mechanism 80 to blast and relieve pressure in time, according to an example of the present application, a battery cell 30 is provided, including: a shell 40, where the shell 40 has a wall portion; an electrode assembly 50, where the electrode assembly 50 is accommodated in the shell 40; a pressure relief mechanism 80, where the pressure relief mechanism 80 is provided on the wall portion, the pressure relief mechanism 80 includes a weak portion 83, a body portion 81, and a connecting portion 82, the weak portion 83 is configured to be damaged when pressure inside the shell 40 reaches a threshold so as to relieve the pressure, the body portion 81 is located in a region defined by the weak portion 83, and the connecting portion 82 is located on an outer side of the weak portion 83 and configured to connect the wall portion; the body portion 81 protrudes relative to the connecting portion 82 in a direction away from the electrode assembly 50, and a first concave portion 84 is formed in the pressure relief mechanism 80 at a position corresponding to the body portion 81 on a side facing the electrode assembly 50.

It should be noted that the electrode assembly 50 in the example of the present application may be a wound electrode assembly, a laminated electrode assembly, or an electrode assembly in other forms.

In some examples, the electrode assembly 50 is a wound electrode assembly. The positive electrode sheet, the negative electrode sheet, and the isolator all have strip-shaped structures. In an example of the present application, the positive electrode sheet, the isolator, and the negative electrode sheet may be stacked in sequence and wound for more than two turns to form the electrode assembly 50.

In some examples, the electrode assembly 50 is a laminated electrode assembly. Specifically, the electrode assembly 50 includes a plurality of positive electrode sheets and a plurality of negative electrode sheets. The positive electrode sheets and the negative electrode sheets are alternately stacked, and a stacking direction is parallel to a thickness direction of the positive electrode sheets and a thickness direction of the negative electrode sheets.

In the examples of the present application, the end cap 41 may include a wall portion. That is, the pressure relief mechanism 80 may be provided on the end cap 41. Alternatively, the shell 40 may include a wall portion. That is, the pressure relief mechanism 80 may be provided on the shell 40. The pressure relief mechanism 80 in the example of the present application is provided on the wall portion. It may be understood that the shell 40 and the pressure relief mechanism 80 may have separate structures. That is, the two are manufactured separately and then assembled by mechanical connection. The shell 40 and the pressure relief mechanism 80 may also be formed into an integral structure. For example, in the present application, a predetermined region of the wall portion may be thinned to form the pressure relief mechanism 80. For the sake of simplicity, the following examples are described with the end cap 41 as a wall portion.

The end cap 41 is thicker than the case 42, so that the rigidity of the end cap 41 is greater than that of the case 42. Under the same pressure, the end cap 41 is not prone to deformation. In the process of transportation, temperature change or charging and discharging of the battery cell 30, the internal pressure of the battery cell 30 changes alternately between high and low. Therefore, when the pressure relief mechanism 80 is provided on the end cap 41, the alternating stress acts on the pressure relief mechanism 80, the pressure relief mechanism 80 is actuated to discharge high temperature and high pressure substances, and the structure of the end cap 41 is not easily damaged.

In the battery cell 30 according to the example of the present application, the weak portion 83 refers to a part of the pressure relief mechanism 80 which is weak in strength relative to the body portion 81 and the connecting portion 82 and is easy to be broken, crushed, torn or opened. The pressure relief mechanism 80 includes a weak portion 83, a body portion 81 and a connecting portion 82, and the weak portion 83 is located at a junction between the body portion 81 and the connecting portion 82. It may be understood that a predetermined region of the pressure relief mechanism 80 is thinned, the thinned portion forms the weak portion 83, and the two parts separated by the weak portion 83 and connected by the weak portion 83 form the main body portion 81 and the connecting portion 82. Alternatively, material treatment is performed on the predetermined region of the pressure relief mechanism 80, so that the strength of the region is weaker than that of other regions, the region with low strength forms the weak portion 83, two parts high in strength and separated by the weak portion 83 and connected by the weak portion 83 form the body portion 81 and the connecting portion 82.

The connecting portion may be directly connected to the wall portion, or may be indirectly connected to the wall portion through other parts.

In some examples, the weak portion may encircle the body portion. In other examples, the weak portion may also surround the body portion at a certain angle. For example, the weak portion may surround the body portion at 180° to 300°.

When the preset pressure value of the battery cell 30 is small, the requirement on the strength of the weak portion 83 is correspondingly low. However, in order to ensure the dimensional accuracy of the weak portion 83, there is a need to maintain the weak portion 83 with a certain strength. In the process of transportation, temperature change or charging and discharging of the battery cell 30, the internal pressure of the battery cell 30 changes alternately between high and low, so that the pressure relief mechanism 80 may deform by bulging away from the electrode assembly 50 or recessing close to the electrode assembly 50. When the pressure relief mechanism 80 deforms alternately between bulging and recessing, the weak portion 83 connected to the body portion 81 and the connecting portion 82 may bear the alternating stress. In order to prevent the breakage of the weak portion 83 under the action of the alternating stress, there is a need to maintain the weak portion 83 with a certain strength. However, since the weak portion 83 has a certain strength, when the internal pressure of the battery cell 30 exceeds the preset pressure value, the weak portion 83 may not break in time. If the internal pressure of the battery cell 30 is excessively high, the gas inside the battery cell 30 cannot be discharged in time, which may cause the battery cell 30 to expand or even explode.

In the battery cell 30 according to the example of the present application, the body portion 81 protrudes relative to the connecting portion 82 in a direction away from the electrode assembly 50, a sudden change in a cross section occurs at the weak portion 83, stress concentration occurs in the weak portion 83, and the first concave portion 84 is formed in the pressure relief mechanism 80 at a position corresponding to the body portion 81 on a side facing the electrode assembly 50, which further aggravates the stress concentration of the weak portion 83, making the weak portion 83 easy to break and capable of releasing pressure when the pressure in the shell 40 reaches a threshold, and ensures the safety of the battery cell 30 in the case of thermal runaway, being conducive to improving stability and safety of use of the battery cell 30.

In some examples, the battery cell 30 also includes a protective sheet 90. The protective sheet 90 is attached to an outer surface of the wall portion of the shell 40 and covers the pressure relief mechanism 80.

The protective sheet 90 can protect the pressure relief mechanism 80, and reduce distortion or dent formation of the pressure relief mechanism 80 caused by an accidental impact or scratch of an external object on the pressure relief mechanism 80, thereby affecting the possibility of normal fracture and blasting of the weak portion 83 of the pressure relief mechanism 80.

In some examples, the protective sheet 90 is located on an upper side of the end cap and covers the through hole 412. The material of the protective sheet 90 may be plastics such as PE or PP.

In the battery cell 30 according to the example of the present application, the weak portion 83 may be in a shape such as a curved structure or a ring structure. When the weak portion 83 is of the ring structure or the ring structure, the body portion 81 is located in a region defined by the weak portion 83, and the connecting portion 82 is located on an outer side of the weak portion 83. The connecting portion 82 is configured to connect the wall portion of the shell 40.

In some examples, the weak portion 83 may reduce the local strength of the pressure relief mechanism 80 by forming a notch, groove or other structures on the pressure relief mechanism 80.

In some examples, referring to FIG. 8 to FIG. 15, the weak portion 83 is formed by providing a groove 83*c* on the pressure relief mechanism 80. The connecting portion 82 has a first outer surface 82*a* and a first inner surface 82*b* along a thickness direction X of the pressure relief mechanism 80. The first inner surface 82*b* faces the electrode assembly 50.

For example, the material may be removed from the pressure relief mechanism 80 by machining to form the groove 83*c*, which is beneficial to reduce the machining cost and the machining difficulty. Along the thickness direction X, the weak portion 83 and the groove 83c are arranged correspondingly.

Figure 8:
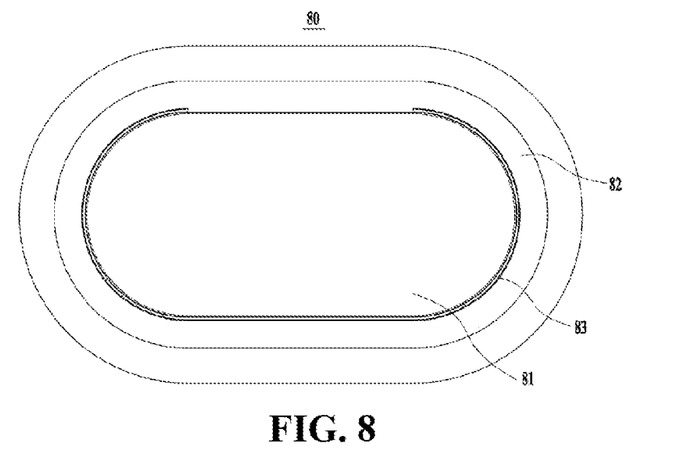
FIG. 8 is a schematic structural diagram of a top view of the battery cell according to an example of the present application.

In some examples, referring to FIG. 8, the groove 83c on the pressure relief mechanism 80 is curved, and the weak portion 83 corresponding to the groove 83c is of a curved structure. The groove 83c on the pressure relief mechanism 80 is strip-shaped, and the weak portion 83 corresponding to the groove 83c is of a strip-shaped structure.

When the internal pressure of the battery cell 30 changes alternately between high and low, the weak portion 83 is prone to fatigue aging or fracture. The body portion 81 flips after the fracture of the weak portion 83, thereby relieving the pressure of the battery cell 30.

Figure 9:
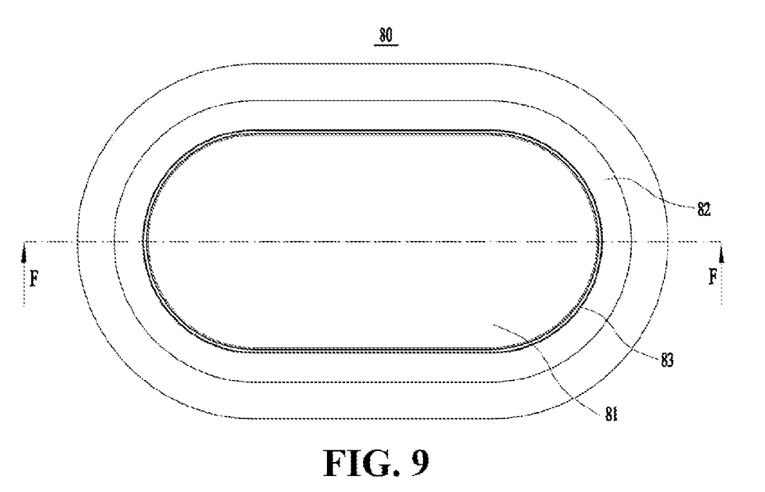
FIG. 9 is a schematic structural diagram of a top view of the battery cell according to another example of the present application.

In some examples, referring to FIG. 9, the groove 83c on the pressure relief mechanism 80 is ring-shaped. The weak portion 83 corresponding to the groove 83c is also ring-shaped. The body portion 81 is located in the region defined by the weak portion 83. The connecting portion 82 is configured to connect the wall portion.

In some examples, a region defined by the groove 83c may be in a shape of a racetrack, a circle, a rectangle, or an oval. When the internal pressure of the battery cell 30 changes alternately between high and low, the weak portion 83 is prone to fatigue aging or fracture. After the fracture of the weak portion 83, the through hole 412 in the wall portion is exposed, the battery cell 30 communicates with the external environment, and the battery cell 30 can quickly relieve the pressure.

In some examples, the groove 83c is recessed along the thickness direction X.

Figure 10:
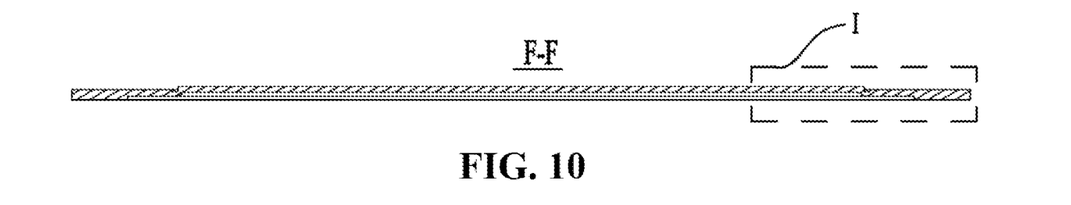
FIG. 10 is a schematic diagram of a sectional structure taken along an F-F direction in FIG. 9.
Figure 11:
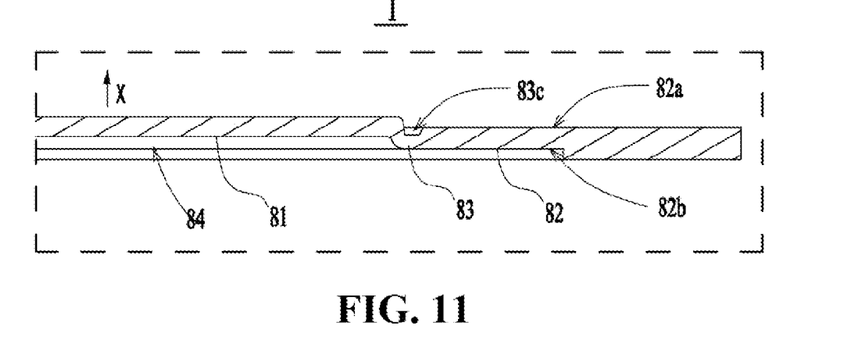
FIG. 11 is a schematic enlarged view of I in FIG. 10.

In some examples, referring to FIG. 10 and FIG. 11, the groove 83c is recessed relative to the first outer surface 82a in a direction toward the electrode assembly 50.

Figure 12:
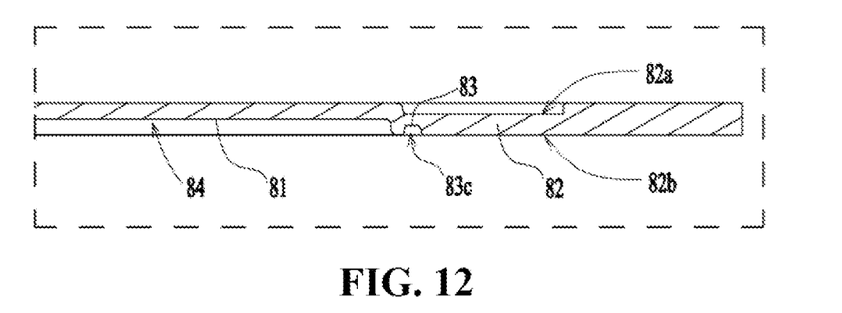
FIG. 12 is a partial schematic cross-sectional view of a pressure relief mechanism of the battery cell according to an alternative example.

In some other examples, referring to FIG. 12, the groove 83c is recessed relative to the first inner surface 82b in a direction away from the electrode assembly 50.

Figure 13:
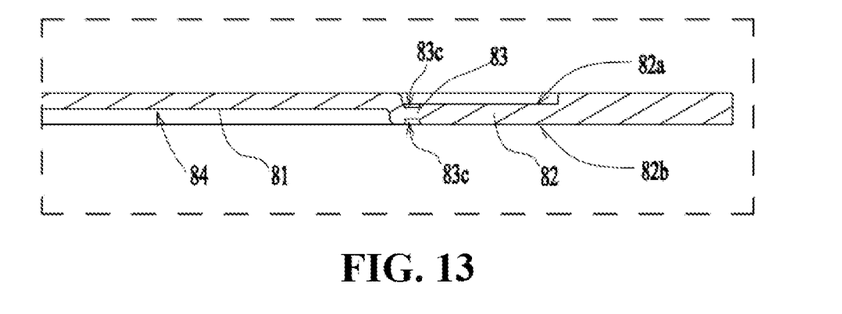
FIG. 13 is a partial schematic cross-sectional view of the pressure relief mechanism of the battery cell according to another alternative example.

In some other examples, referring to FIG. 13, two grooves 83c are provided, one groove 83c is recessed relative to the first inner surface 82b in a direction away from the electrode assembly 50, and the other groove 83c is recessed relative to the first outer surface 82a in a direction toward the electrode assembly 50.

Figure 14:
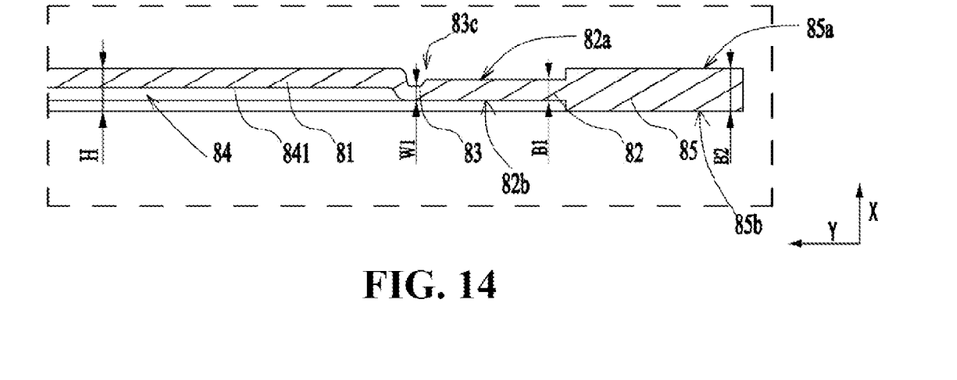
FIG. 14 is a partial schematic cross-sectional view of the pressure relief mechanism of the battery cell according to yet another alternative example.

In some examples, referring to FIG. 14, a thickness of the body portion 81 and a thickness of the connecting portion 82 are both greater than a thickness of the weak portion 83. The strength of the weak portion 83 is smaller than that of the body portion 81 and the connecting portion 82, and is more easily damaged, so that the pressure of the battery cell 30 can be relieved in time when the battery cell is subjected to thermal runaway.

In some examples, the thickness of the connecting portion 82 is B1, and the thickness of the weak portion 83 is W1, where $0.1 \leq W1/B1 \leq 0.5$. When the thicknesses of the weak portion 83 and the connecting portion 82 are within the above numerical range, machining accuracy of the weak portion 83 can be improved, thereby improving uniformity of the thickness of the weak portion 83. When the weak portion 83 is subjected to alternating stress, degrees of damages to the weak portion 83 is relatively uniform, so that blasting consistency of the battery can be improved.

When $W1/B1<0.1$, the thickness of the weak portion 83 is relatively thin, and the strength of the weak portion 83 is low. When the battery cell 30 does not undergo thermal runaway, the weak portion 83 is easily damaged. Moreover, when the weak portion 83 with the thickness is formed, a dimension of the weak portion 83 fluctuates greatly, and the thickness thereof has poor uniformity. When weak portions 83 of different battery cells 30 are subjected to alternating stress, regions or degrees of fatigue aging may be different, resulting in poor consistency of blasting pressure relief of different battery cells 30.

When $W1/B1>0.5$, the thickness of the weak portion 83 is relatively thick, and the strength of the weak portion 83 is high. When a preset pressure value of the battery cell 30 is small, the weak portion 83 is not easy to be damaged. When the battery cell 30 is subjected to thermal runaway, gas inside the battery cell 30 cannot be discharged in time, and the battery cell 30 is prone to expansion or even explosion.

In the battery cell 30 according to the example of the present application, referring to FIG. 14, the first concave portion 84 is recessed relative to the first inner surface 82b in a direction away from the electrode assembly 50. Stress concentration is formed at the weak portion 83, and the weak portion 83 is easily damaged, so that the pressure of the battery cell 30 can be relieved in time.

In some examples, projections of the groove 83c and the first concave portion 84 in a first direction Y at least partially overlap, and the first direction Y is perpendicular to a thickness direction X of the pressure relief mechanism 80. The groove 83c and the weak portion 83 are arranged correspondingly in the thickness direction X, and the projections of the groove 83c and the first concave portion 84 in the first direction Y at least partially overlap, which may aggravate the stress concentration of the weak portion 83, the weak portion 83 is more easily damaged, and the pressure of the battery cell 30 can be relieved in time.

In some examples, referring to FIG. 14, the first concave portion 84 is recessed relative to the first inner surface 82b in a direction away from the electrode assembly 50, and at least a part of the body portion 81 protrudes from the first outer surface 82a. At least a part of the body portion 81 protrudes from the first outer surface 82a, a stepped structure is formed between the body portion 81 and the connecting portion 82, and the stress at a junction between the body portion 81 and the connecting portion 82 may be significantly increased. However, the weak portion 83 is located at a junction between the body portion 81 and the connecting portion 82, so the stress concentration at the weak portion 83 may be aggravated.

In some examples, referring to FIG. 14, in the thickness direction X of the pressure relief mechanism 80, the thickness of the connecting portion 82 is B1, and a height of the body portion 81 is H, where $H/B1 \leq 2$. When the thicknesses of the connecting portion 82 and the body portion 81 are within the above numerical range, the body portion 81 has a moderate height and is easily machined, which can prevent interference between the body portion 81 and a foreign matter outside the battery cell 30 in a case where the stress concentration in the weak portion 83 is aggravated.

When $H/B1>2$, the body portion 81 is excessively high and is not easily machined. Moreover, the excessively high body portion 81 may protrude from a surface of the battery cell 30 to interfere with a foreign matter outside the battery cell 30.

In some examples, referring to FIG. 14, the first concave portion 84 has a bottom wall 841, the first concave portion 84 is recessed from the first inner surface 82b to the bottom wall 841 in a direction away from the electrode assembly 50, and the bottom wall 841 does not extend beyond the first outer surface 82a in a direction away from the electrode assembly 50. Along the thickness direction X, as a distance between the bottom wall 841 and the first outer surface 82a decreases, the first concave portion 84 is recessed deeper in the thickness direction X, stress concentration is more easily formed at a junction between the body portion 81 corresponding to the position of the first concave portion 84 and the weak portion 83, and the weak portion 83 is more easily damaged.

In some examples, the pressure relief mechanism 80 according to the example of the present application further includes a transition portion 85. As shown in FIG. 14, the transition portion 85 is provided around the connecting portion 82 and configured to connect the wall portion and the connecting portion 82, and a thickness of the transition portion 85 is greater than that of the connecting portion 82. The thickness of the transition portion 85 is relatively thicker, which can improve welding strength of the transition portion 85, and prevent distortion or burn-through during welding caused by a small thickness of the transition portion 85. In addition, the thickness of the connecting portion 82 is relatively thinner, so that the pressure relief mechanism 80 is easily broken when subjected to alternating stress, and the pressure can be relieved in time.

In some examples, the thickness of the connecting portion 82 is B1, and the thickness of the transition portion 85 is B2, where B1/B2≤⅔. When the thicknesses of the connecting portion 82 and the transition portion 85 are within this numerical range, the thicknesses of the connecting portion 82 and the transition portion 85 are moderate, which can satisfy both welding strength of the transition portion 85 and a strength requirement of the connecting portion 82.

It should be noted that the transition portion 85 has a second outer surface 85a and a second inner surface 85b along the thickness direction X of the pressure relief mechanism 80, and the second inner surface 85b faces the electrode assembly 50.

In some examples, the second outer surface 85a protrudes beyond the first outer surface 82a in a direction away from the electrode assembly 50.

In some examples, the second inner surface 85b protrudes beyond the first inner surface 82b in a direction close to the electrode assembly 50.

In some examples, the second outer surface 85a protrudes from the first outer surface 82a in a direction away from the electrode assembly 50; and the second inner surface 85b protrudes from the first inner surface 82b in a direction close to the electrode assembly 50.

As an example, the thickness of the connecting portion 82 is B1, and the thickness of the transition portion 85 is B2, where B1/B2≤⅔. When the thicknesses of the connecting portion 82 and the transition portion 85 are within this numerical range, the thicknesses of the connecting portion 82 and the transition portion 85 are moderate, which can satisfy both welding strength of the transition portion 85 and the tearing strength of the connecting portion 82.

In some examples, the transition portion 85 and the connecting portion 82 are smoothly connected in a transitional manner, which prevents fracture at a junction between the transition portion 85 and the connecting portion 82 during the mounting.

Figure 15:
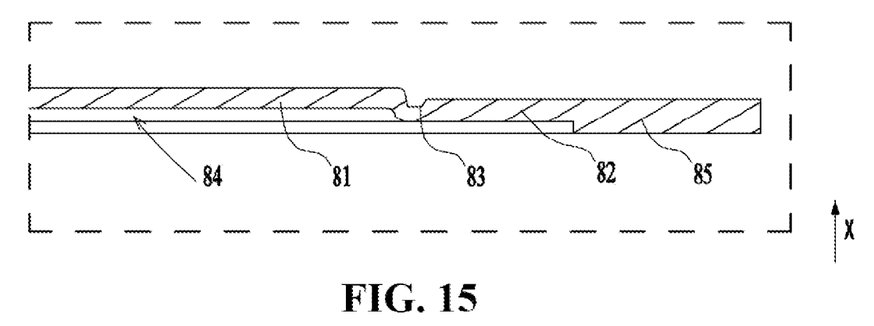
FIG. 15 is a partial schematic cross-sectional view of the pressure relief mechanism of the battery cell according to still another alternative example.

In some examples, referring to FIG. 15, along the thickness direction X, the body portion 81 protrudes relative to the transition portion 85 in a direction away from the electrode assembly 50. Moreover, the thickness of the transition portion 85 is greater than that of the connecting portion 82. A stepped structure is formed among the body portion 81, the weak portion 83, the connecting portion 82, and the transition portion 85, and the weak portion 83 and the connecting portion 82 are prone to stress concentration. In particular, the stress concentration of the weak portion 83 may be aggravated, the weak portion 83 is easily damaged, and the pressure of the battery cell 30 can be relieved in time.

A minimum dimension of the connecting portion 82 in the example of the present application along the first direction Y is greater than 0.1 mm. The weak portion 83 is closer to a central position of the pressure relief mechanism 80, the weak portion 83 is subjected to more uniform alternating stress, and the consistency of the fracture of the weak portion 83 is higher.

Figure 16:
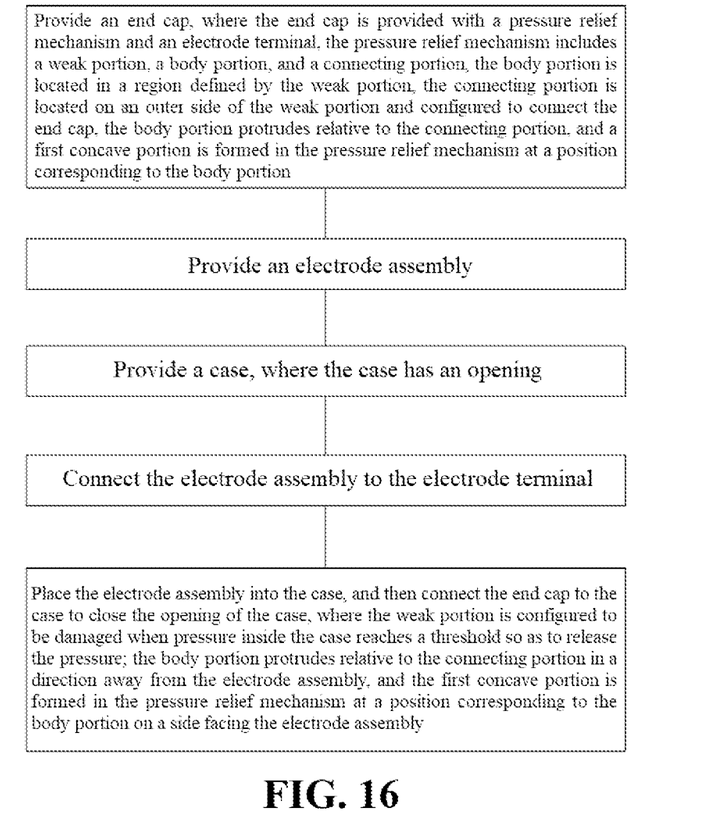
FIG. 16 is a schematic flow chart of a manufacturing method for a battery cell according to an example of the present application.

Referring to FIG. 16, according to an example of the present application, a manufacturing method for a battery cell 30 is further provided, which includes:

providing an end cap 41, where the end cap 41 is provided with a pressure relief mechanism 80 and an electrode terminal 60, the pressure relief mechanism 80 includes a weak portion 83, a body portion 81, and a connecting portion 82, the body portion 81 is located in a region defined by the weak portion 83, the connecting portion 82 is located on an outer side of the weak portion 83 and configured to connect the end cap 41, the body portion 81 protrudes relative to the connecting portion 82, and a first concave portion 84 is formed in the pressure relief mechanism 80 at a position corresponding to the body portion 81;

providing an electrode assembly 50;

providing a case 42, where the case 42 has an opening 421;

connecting the electrode assembly 50 to the electrode terminal 60; and placing the electrode assembly 50 into the case 42, and then connecting the end cap 41 to the case 42 to close the opening 421 of the case 42, where the weak portion 83 is configured to be damaged when pressure inside the case 42 reaches a threshold so as to relieve the pressure; the body portion 81 protrudes relative to the connecting portion 82 in a direction away from the electrode assembly 50, and the first concave portion 84 is formed in the pressure relief mechanism 80 at a position corresponding to the body portion 81 on a side facing the electrode assembly 50.

In the battery cell 30 manufactured with the manufacturing method for the battery cell 30 according to the example of the present application, the body portion 81 of the pressure relief mechanism 80 protrudes relative to the connecting portion 82 in a direction away from the electrode assembly 50, stress concentration occurs in the weak portion 83, and the first concave portion 84 is formed in the pressure relief mechanism 80 at a position corresponding to the body portion 81 on a side facing the electrode assembly 50, so as to aggravate the stress concentration of the weak portion 83 and reduce the strength of the weak portion 83, making the weak portion 83 easy to break and capable of releasing pressure when the pressure in the shell 40 reaches a threshold, which ensures the safety of the battery cell 30 in the case of thermal runaway and is conducive to improving stability and safety of use of the battery.

The battery cell 30 in the above example can be manufactured with the manufacturing method for the battery cell 30 according to the example of the present application.

Figure 17:
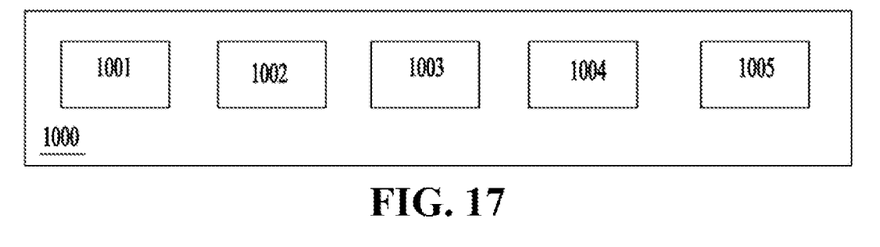
FIG. 17 is a schematic block diagram of a manufacturing system for a battery cell according to an example of the present application.

Referring to FIG. 17, according to an example of the present application, a manufacturing system 1000 for a battery cell 30 is further provided, including:

a first providing device 1001 configured to provide an end cap 41, where the end cap 41 is provided with a pressure relief mechanism 80 and an electrode terminal 60, the pressure relief mechanism 80 includes a weak portion 83, a body portion 81, and a connecting portion 82, the body portion 81 is located in a region defined by the weak portion 83, the connecting portion 82 is located on an outer side of the weak portion 83 and configured to connect the end cap 41, the body portion 81 protrudes relative to the connecting portion 82, and a first concave portion 84 is formed in the pressure relief mechanism 80 at a position corresponding to the body portion 81;

a second providing device 1002 configured to provide an electrode assembly 50;

a third providing device 1003 configured to provide a case 42, where the case 42 has an opening 421;

a first assembling device 1004 configured to connect the electrode assembly 50 to the electrode terminal 60; and a second assembling device 1005 configured to place the electrode assembly 50 into the case 42, and then connecting the end cap 41 to the case 42 to close the opening 421 of the case 42, where the weak portion 83 is configured to be damaged when pressure inside the case 42 reaches a threshold so as to relieve the pressure; the body portion 81 protrudes relative to the connecting portion 82 in a direction away from the electrode assembly 50, and the first concave portion 84 is formed in the pressure relief mechanism 80 at a position corresponding to the body portion 81 on a side facing the electrode assembly 50.

In the battery cell 30 manufactured with the manufacturing method for the battery cell 30 according to the example of the present application, the body portion 81 of the pressure relief mechanism 80 protrudes relative to the connecting portion 82 in a direction away from the electrode assembly 50, stress concentration occurs in the weak portion 83, and the first concave portion 84 is formed in the pressure relief mechanism 80 at a position corresponding to the body portion 81 on a side facing the electrode assembly 50, so as to aggravate the stress concentration of the weak portion 83 and reduce the strength of the weak portion 83, making the weak portion 83 easy to break and capable of releasing pressure when the pressure in the shell 40 reaches a threshold, which ensures the safety of the battery cell 30 in the case of thermal runaway and is conducive to improving stability and safety of use of the battery.

The manufacturing system for the battery cell 30 according to the example of the present application can perform the manufacturing method for the battery cell 30 in the above example.

While the present application has been described with reference to the preferred examples, various modifications may be made and components therein may be replaced with equivalents without departing from the scope of the present application. In particular, the technical features mentioned in the various examples can be combined in any manner provided that there is no structural conflict. The present application is not limited to the specific examples disclosed herein, but rather includes all technical solutions falling within the scope of the claims.

The invention claimed is:

1. A battery cell, comprising:
a shell, wherein the shell has, a wall portion;
an electrode assembly, wherein the electrode assembly is accommodated in the shell; and
a pressure relief mechanism, wherein the pressure relief mechanism is provided on the wall portion, the pressure relief mechanism comprises a weak portion, a body portion, and a connecting portion, wherein the weak portion encircles the body portion and is configured to be damaged when pressure inside the shell reaches a threshold so as to relieve the pressure, the body portion is located in a region defined by the weak portion and has an outer surface away from the electrode assembly along a thickness direction of the pressure relief mechanism, the outer surface of the body portion extends flatly across the entire region in a first direction perpendicular to a thickness direction of the pressure relief mechanism, and the connecting portion is located on an outer side of the weak portion and configured to connect the wall portion; and, wherein the body portion protrudes relative to the connecting portion in a direction away from the electrode assembly, and a first concave portion is formed in the pressure relief mechanism at a position corresponding to the body portion on a side facing the electrode assembly, the connecting portion has a first outer surface and a first inner surface along the thickness direction of the pressure relief mechanism, and the first inner surface faces the electrode assembly, the first concave portion has a bottom wall and is recessed in a direction from the first inner surface of the connecting portion to the bottom wall away from the electrode assembly, the bottom wall of the first concave portion extends flatly across the entire region defined by the weak portion in the first direction, wherein the weak portion is formed by providing a groove on the pressure relief mechanism, wherein projections of the groove and the first concave portion in the first direction at least partially overlap.

2. The battery cell according to claim 1, wherein a thickness of the body portion and a thickness of the connecting portion are both greater than a thickness of the weak portion.

3. The battery cell according to claim 2, wherein the thickness of the connecting portion is B1, and the thickness of the weak portion is W1, wherein $0.1 \leq W1/B1 \leq 0.5$.

4. The battery cell according to claim 1, wherein the connecting portion has a first outer surface and a first inner surface along the thickness direction of the pressure relief mechanism, and the first inner surface faces the electrode assembly; and the groove is recessed relative to the first inner surface in a direction away from the electrode assembly; and/or
the groove is recessed relative to the first outer surface in a direction toward the electrode assembly.

5. The battery cell according to claim 1, wherein the connecting portion has a first outer surface and a first inner surface along the thickness direction of the pressure relief mechanism, and the first inner surface faces the electrode assembly; and the first concave portion is recessed relative to the first inner surface in a direction away from the electrode assembly, and at least a part of the body portion protrudes from the first outer surface.

6. The battery cell according to claim 5, wherein, in a thickness direction of the pressure relief mechanism, the thickness of the connecting portion is B1, and a height of the body portion is H, wherein $H/B1 \leq 2$.

7. The battery cell according to claim 5, wherein the bottom wall does not extend beyond the first outer surface in a direction away from the electrode assembly.

8. The battery cell according to claim 1, wherein the pressure relief mechanism further comprises a transition portion, the transition portion is provided around the connecting portion and configured to connect the wall portion and the connecting portion, and a thickness of the transition portion is greater than that of the connecting portion.

9. The battery cell according to claim 8, wherein the thickness of the connecting portion is B1, and the thickness of the transition portion is B2, wherein $B1/B2 \leq 2/3$.

10. The battery cell according to claim 8, wherein, the transition portion has a second outer surface and a second inner surface along the thickness direction of the pressure relief mechanism, and the second inner surface faces the electrode assembly; and the second outer surface protrudes from the first outer surface in a direction away from the electrode assembly; and/or the second inner surface protrudes from the first inner surface in a direction close to the electrode assembly.

11. The battery cell according to claim 8, wherein the body portion protrudes relative to the transition portion in a direction away from the electrode assembly.

12. The battery cell according to claim 8, wherein a minimum dimension of the connecting portion along the first direction is greater than 0.1 mm.

13. The battery cell according to claim 1, wherein the battery cell further comprises a protective sheet, and the protective sheet is attached to an outer surface of the wall portion and covers the pressure relief mechanism.

14. The battery cell according to claim 1, wherein the shell comprises an end cap and a case, the case is provided with an opening, and the end cap is configured to cover the opening, wherein the wall portion is the end cap.

15. A battery, comprising: the battery cell according to claim 1.

16. A powered device, comprising the battery according to claim 15, wherein the battery is configured to provide electric energy.

* * * * *